UNITED STATES PATENT OFFICE.

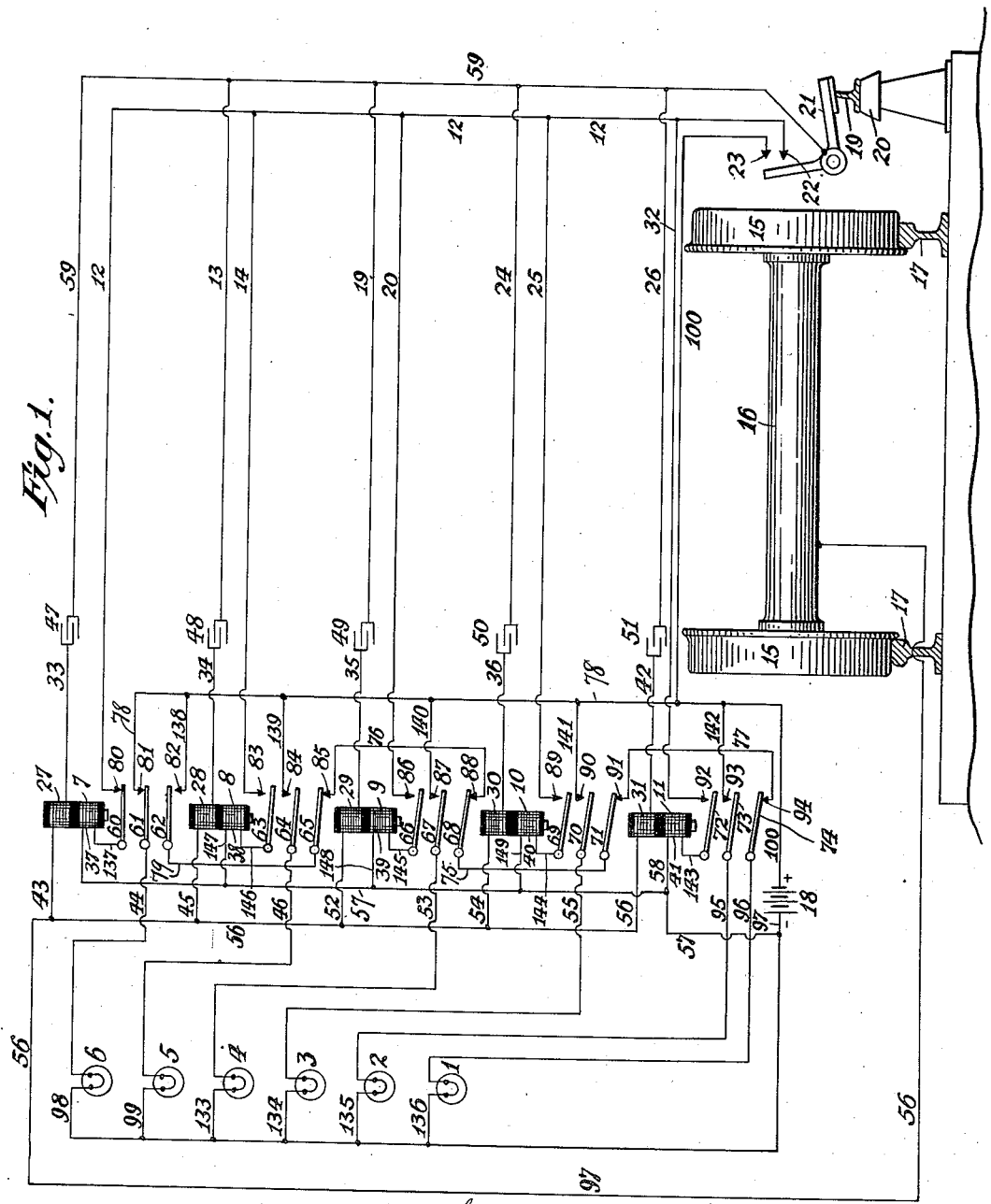

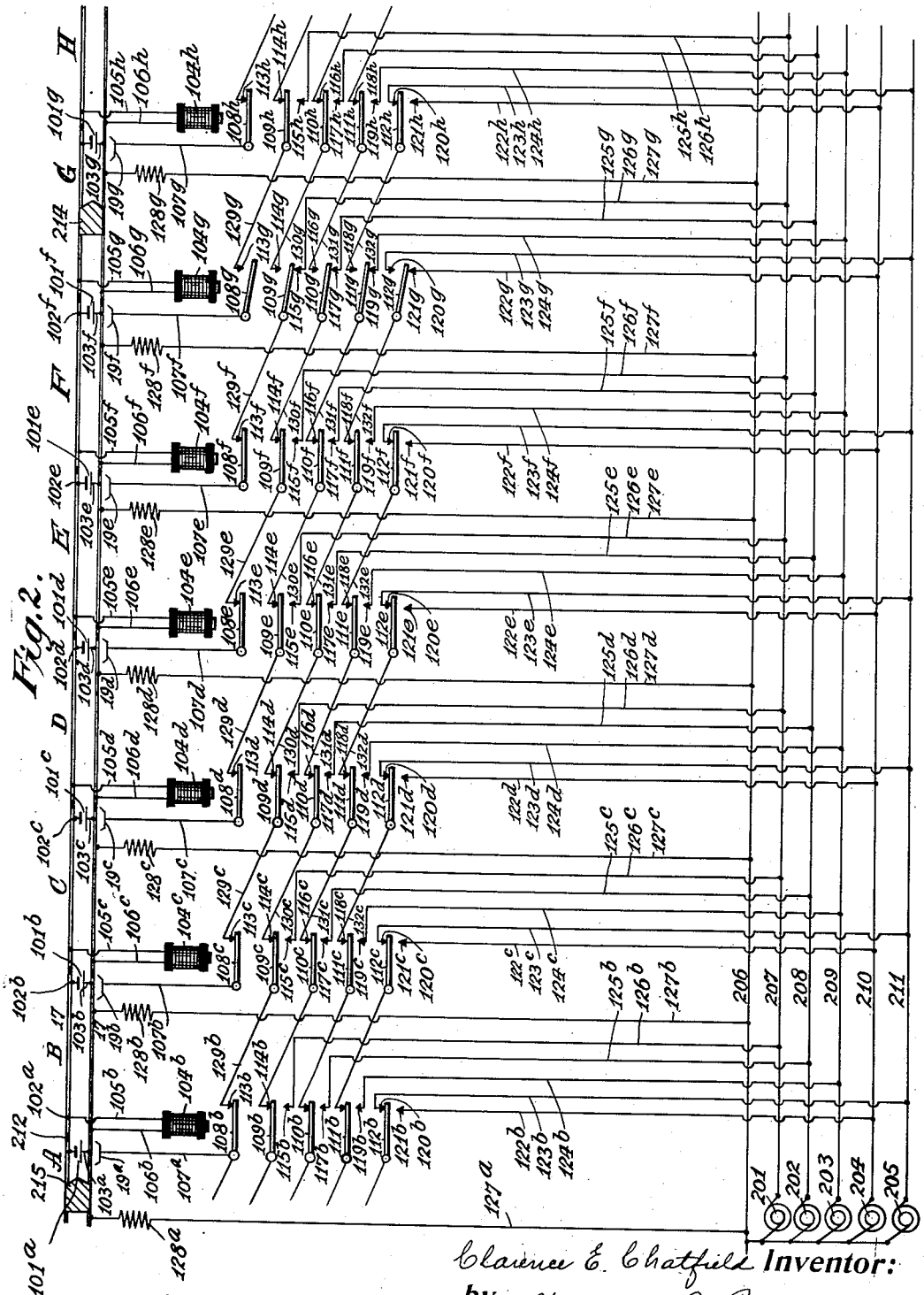
C. E. CHATFIELD.
SIGNAL SYSTEM FOR MOVING VEHICLES.
APPLICATION FILED MAR. 6, 1917.
1,305,523.
Patented June 3, 1919.
2 SHEETS—SHEET 2.

CLARENCE E. CHATFIELD, OF BUFFALO, NEW YORK, ASSIGNOR TO THE SIMMEN AUTOMATIC RAILWAY SIGNAL COMPANY, OF BUFFALO, NEW YORK, A CORPORATION OF ARIZONA.

SIGNAL SYSTEM FOR MOVING VEHICLES.

1,305,523.     Specification of Letters Patent.     Patented June 3, 1919.

Application filed March 6, 1917. Serial No. 152,550.

*To all whom it may concern:*

Be it known that I, CLARENCE E. CHATFIELD, a citizen of the United States, residing at Buffalo, in the county of Erie and State of New York, have invented certain new and useful Improvements in Signal Systems for Moving Vehicles, of which the following is a specification.

This invention relates to a system of signals for moving vehicles adapted to advise the operator of the vehicle of the conditions of safety or danger along the route over which the vehicle is traveling, or other conditions which it may be desirable or convenient for him to know, and particularly to such a system in which a plurality of signal indications are carried on the vehicle.

There is already known in the art a vehicle signal system which comprises three signals on the vehicle actuated through the medium of an intermittently acting device external to the vehicle which is electrical in character and capable of being energized in either of two directions or deënergized. There is also known in the art a vehicle signal system, together with the coöperating speed control system, in which four indications are obtained on the vehicle by the use of three contact shoes carried thereon and adapted to coöperate with three signal rails arranged at different lateral distances from the running rails and with appropriate electrical connections.

The subject matter of this application is specifically to provide a signal system having a plurality of indications on the vehicle which are obtained by the use of a single contact shoe and signal rail, together with a plurality of alternating current generators of different frequencies, outside the vehicle, for actuating the devices carried by the vehicle. The devices on the vehicle include relays having an alternating current coil for operating purposes and a direct current coil for holding purposes. The alternating current coils of the relays are so constructed that they have different impedance and each such coil is in series with a condenser, the condensers having different capacities. Each alternating current coil and its corresponding condenser, are proportioned so that they are in resonance, there being a relay and a condenser provided corresponding to each alternating current generator used.

For the purpose of promoting clearness in the description, five relays are shown on the vehicle, together with coöperating devices, to control six signals thereon, but it is to be understood that the number can be varied without departing from the principles of the invention.

In the following description, there is shown a track control system for the vehicle signals based on direct current continuous track circuits which are well known in the art. The devices shown, however, may be controlled in this manner, or by alternating current track circuits or by the mechanism of an interlocking plant or by a remote central control system, or by any other method desirable or available without departing from the principles of the invention.

In the drawings, there is illustrated a preferred form of apparatus embodying the invention, the parts being shown largely in diagram for the purpose of clearness and the positions of the parts being those assumed when a clear signal has been indicated on the vehicle.

In the drawings, Figure 1 is a diagrammatic view of the devices on the vehicle, the signal rail being shown in section; and Fig. 2 is a diagram of a track way divided into six complete blocks with portions of two other blocks shown.

The track equipment is as follows: 17, 17 indicate track rails along which the vehicle is adapted to travel and which rails are divided by insulated joints 212 into blocks designated by the letters A, B, C, D, E, F, G, and H. The equipment of all the blocks is identical and the corresponding devices in each block are designated by the same numbers with the lower case letters of the alphabet following each number to designate the particular block referred to. The devices in block C will be described and it will be understood that the devices in the other blocks are the same. At one end of the block is a track battery 101$^c$, which is connected to the rails 17, 17 by wires 102$^c$ and 103$^c$. At the other end of the block is a track relay 104$^c$, connected to the rails by the wires 105$^c$ and 106$^c$. The relay 104$^c$ has five neutral armatures 108$^c$, 109$^c$, 110$^c$, 111$^c$, 112$^c$, adapted when the relay 104$^c$ is energized, to touch contacts 113$^c$, 114$^c$, 116$^c$, 118$^c$ and 120$^c$ respectively, and when the relay is deënergized to touch contacts 115$^c$, 117$^c$, 119$^c$ and 121$^c$ respectively. At the exit end of the block C, that is, at the entrance to the block D, there is provided a signal rail 19$^c$, which is connected by a wire 107$^c$ with the armature 108$^d$. Line wires 206, 207, 208, 209, 210 and 211 are provided along the trackway and a wire 206 serves as a common return wire and is connected to one track rail of each block by means of a wire and resistance coil indicated at 127$^c$ and 128$^c$. The purpose of the resistance coil 128$^c$ is to prevent the current from the track battery of one block flowing into another block.

Alternating current generators 201, 202, 203, 204 and 205 of substantially different frequencies, have one terminal of each connected respectively to the wires 207, 208, 209, 210 and 211, and the other terminal of each connected to the common return wire 206. The various line wires, track relays and signal rails are connected by other electrical conductors or wires which will be severally referred to in the description of the electrical circuits hereinafter given.

The vehicle stands on track rails 17, 17, its wheels 15, 15 resting thereon. 16 is the axle connecting the wheels. A shoe 21 is hingedly mounted at a convenient place on the vehicle and is adapted to contact with the signal rails 19 in succession, during which contact it breaks contact with points or terminals 22 and 23, and after leaving such signal rails, is restored by gravity or spring pressure to contact with these same points. Relays on the vehicle are indicated at 7, 8, 9, 10 and 11, the relay 7 having an alternating current operating coil 27, and a direct current holding coil 37, the relay 8 having an alternating current operating coil 28, and a direct current holding coil 38, the relay 9 having an alternating current operating coil 29, and a direct current holding coil 39, the relay 10 having an alternating current operating coil 30 and a direct current holding coil 40, and the relay 11 having an alternating current operating coil 31 and a direct current holding coil 41.

Connected in series with the alternating current operating coil of each relay is a condenser. The condenser 47 is in series with the coil 27, the condenser 48 is in series with the coil 28, the condenser 49 with the coil 29, the condenser 50 with the coil 30, and the condenser 51 with the coil 31. The various alternating current operating coils together with their corresponding condensers are connected in multiple between the contact shoe and the car axle, their respective circuits being as follows: From the shoe 21 to the wire 59, condenser 47, wire 33, coil 27, wire 43 and wire 56 to the axle 16; from the shoe 21 to the wire 59, wire 13, condenser 48, wire 34, coil 28, wire 45 and wire 56 to the axle 16; from the shoe 21 to the wire 59, wire 19, condenser 49, wire 35, coil 29, wire 52, and wire 56 to the axle 16; from the shoe 21 to the wire 59, wire 24, condenser 50, wire 36, coil 30, wire 54 and wire 56 to the axle 16; from the shoe 21 to the wire 59, wire 26, condenser 51, wire 42, coil 31 and wire 56 to the axle 16.

It is a well known law of alternating electrical currents that the reactance produced by a condenser decreases as the frequency increases, and the reactance produce by an impedance coil increases as the frequency increases. It is also well known that an impedance coil and a condenser may be connected in series and so proportioned that a large flow of current will be permitted at a given frequency, but that at any other frequency only a small amount of current will flow. This is called a resonant circuit. Use has been made of these phenomena for the purpose of obtaining the following condition: The condenser 47 and the coil 27 are resonant for the frequency of the current produced by the generator 205 and when such current is flowing, the armatures of the relay 7 will be attracted. The condenser 48 and the coil 28 are in like manner resonant for the frequency of the current produced by the generator 204. The condenser 49 and the coil 29 are resonant for the frequency of the current produced by the generator 203. The condenser 50 and the coil 30 are resonant for the frequency of the current produced by the generator 202; and the condenser 51 and the coil 31 are resonant for the frequency of the current produced by the generator 201.

The relay 7 has three neutral armatures 60, 61 and 62. When the relay 7 is energized, the armatures 60 and 61 touch contacts 80 and 81 and when it is deënergized, the armature 62 touches contact 82. The relay 8 has three neutral armatures 63, 64 and 65, and when it is energized, the armatures 63 and 64 touch contacts 83 and 84, and when it is deënergized, the armature 65 touches contact 85. The relay 9 has three neutral armatures 66, 67 and 68, and when it is energized, the armatures 66 and 67 touch contacts 86 and 87, and when it is deenergized, the armature 68 touches contact 88. The relay 10 has three neutral armatures 69, 70 and 71 and when it is energized, the armatures 69 and 70 touch contacts 89 and 90, and when it is deenergized, the armature 71 touches contact 91. The relay 11 has three neutral armatures 72, 73 and 74, and when it is energized the armatures 72 and 73 touch contacts 92 and 93, and when it is deenergized the armature 74 touches contact 94.

A local battery or other source of electricity indicated at 18 is mounted at a convenient place on the vehicle. 6 indicates a clear signal or green light, and 1 a danger signal or red light. 2, 3, 4 and 5 indicate signals representing the number of clear blocks ahead of the train, or other conditions, and may be distinguished by providing them with ground glass inclosures which have the desired indications displayed upon their faces. The described parts are connected together by electrical conductors which will be specifically hereinafter referred to in describing the circuits of which they form a part.

In order to describe the operation of the device, let it be assumed that a train or vehicle 214 is standing in the block G and that another train or vehicle 215 is in the block A and is approaching the first mentioned train or vehicle. In Fig. 2 these trains or vehicles are shown conventionally represented. When the vehicle 214 is in block G the track relay 104$^g$ will be deenergized, due to the presence of its wheels on the rails and the consequent short circuiting of the track battery. The relays 104$^b$, 104$^c$, 104$^d$, 104$^e$ and 104$^f$ will all be energized however as their corresponding blocks are unoccupied and they are energized from their corresponding track batteries.

When the train 215 has moved far enough into the block A for its shoe 21 to contact with the signal rail 19$^a$, a circuit will be closed from one terminal of the generator 205 to the wires 211 and 123$^f$, contact 120$^f$, armature 112$^f$, wire 132$^e$, contact 118$^e$, armature 111$^e$, wire 131$^d$, contact 116$^d$, armature 110$^d$, wire 130$^c$, contact 114$^c$, armature 109$^c$, wire 129$^b$, contact 113$^b$, armature 108$^b$, wire 107$^a$, signal rail 19$^a$, shoe 21, wire 59, coils 27, 28, 29, 30 and 31 and their corresponding condensers, wire 56, axle 16, wheels 15, rails 17, resistance 128$^a$, and wires 127$^a$ and 206 to the other terminal of the generator 205. As the condenser 47 and coil 27 are in resonance for the frequency of the current produced by the generator 205, the armatures of the relay 7 will be the only ones attracted, and this will cause the clear signal lamp 6 to glow through a circuit from the positive side of the battery 18 to the wires 100 and 78, contact 81, armature 61, wire 44, signal lamp 6, and wires 98 and 97 to the negative side of such battery.

After leaving the signal rail 19$^a$, the shoe 21 which has been lifted from contact with the terminals 22 and 23, is restored to such contact, and the relay 7 is energized by its holding coil 37 through a circuit from the positive side of the battery 18 to the wire 100, contact 23, shoe 21, contact 22, wire 12, contact 80, armature 60, wire 137, coil 37 and wires 57 and 97 to the negative side of the battery 18. It will thus be seen that after leaving the signal rail 19$^a$, the signal lamp 6 will continue to burn.

Let it be assumed that the train 214 is still standing in the block G and that the train 215 has moved far enough into the block B for its shoe 21 to contact with the signal rail 19$^b$. Current will then flow through a circuit from one terminal of the generator 204 to the wires 210 and 122$^g$, contact 121$^g$, armature 112$^g$, wire 132$^f$, contact 118$^f$, armature 111$^f$, wire 131$^e$, contact 116$^e$, armature 110$^e$, wire 130$^d$, contact 114$^d$, armature 109$^d$, wire 129$^c$, contact 113$^c$, armature 108$^c$, wire 107$^b$, signal rail 19$^b$, shoe 21, wire 59, coils 27, 28, 29, 30 and 31, and their corresponding condensers, wire 56, axle 16, wheels 15, rail 17, resistance 128$^b$ and wires 127$^b$ and 206 to the other terminal of the generator 204. As the condenser 48 and the coil 28 are in resonance for current of the frequency produced by the generator 204, the armatures of the relay 8 will alone be attracted, and this will cause the signal lamp 5 to glow through a circuit from the positive side of the battery 18 to the wires 100 and 78, wire 139, contact 84, armature 64, wire 46, signal lamp 5, and wires 99 and 97 to the negative side of the battery 18.

After leaving the signal rail 19$^b$, the shoe 21 which has been raised during such contact, will be lowered to touch the terminals 22 and 23 and the relay 8 will remain energized by means of its holding coil 38 through a circuit from the positive side of the battery 18 to the wire 100, contact 23, shoe 21, contact 22, wires 12 and 14, contact 83, armature 63, wire 146, coil 38, and wires 147, 57 and 97 to the negative side of the battery 18, thus causing the signal lamp 5 to continue to burn.

Let it now be assumed that the train 214 is still standing in the block G and that the train 215 has advanced far enough into the block C for its shoe 21 to contact with the signal rail 19$^c$. Current will then flow through a circuit from one terminal of the generator 203 to the wires 209 and 124$^g$, contact 119$^g$, armature 111$^g$, wire 131$^f$, contact 116$^f$, armature 110$^f$, wire 130$^e$, contact 114ᵉ, armature 109ᵉ, wire 129ᵈ, contact 113ᵈ, armature 108ᵈ, wire 107ᶜ, signal rail 19ᶜ, shoe 21, wire 59, coils 27, 28, 29, 30 and 31 and their corresponding condensers, wire 56, axle 16, wheels 15, rails 17, resistance 128ᶜ, and wires 127ᶜ and 206 to the other terminal of the generator 203. As only the condenser 49 and the coil 29 are in resonance for current of the frequency produced by the generator 203, only the armatures of the relay 9 will be attracted, and this will cause the signal lamp 4 to glow through a circuit from the positive side of the vehicle battery 18 to the wires 100 and 78, wire 140, contact 87, armature 67, wire 53, signal lamp 4, and wires 133 and 97 to the negative side of the battery 18. After leaving the signal rail 19ᶜ, the shoe 21 will be restored to contact with the terminals 22 and 23 and the relay 9 will remain energized by means of its holding coil 39 through a circuit from the positive side of the battery 18 to the wire 100, contact 23, shoe 21, contact 22, wires 12 and 20, contact 86, armature 66, wire 145, coil 39, and wires 148, 57 and 97 to the negative side of the battery, and the signal lamp 4 will continue to burn.

Let it be assumed that the train 214 is still standing in the block G, and that the train 215 has advanced into the block D far enough for its shoe 21 to contact with the signal rail 19ᵈ. Current will then flow through a circuit from one terminal of the generator 202 to the wires 208 and 125ᵍ, contact 117ᵍ, armature 110ᵍ, wire 130ᶠ, contact 114ᶠ, armature 109ᶠ, wire 129ᵉ, contact 113ᵉ, armature 108ᵉ, wire 107ᵈ, signal rail 19ᵈ, shoe 21, wire 59, coils 27, 28, 29, 30 and 31 and their corresponding condensers, wire 56, axle 16, wheels 15, rails 17, resistance 128ᵈ and wires 127ᵈ and 206 to the other terminal of the generator 202. As only the condenser 50 and coil 30 are in resonance for the current of the frequency produced by the generator 202, only the armatures of the relay 10 will be attracted. This will cause the signal lamp 3 to glow through a circuit from the positive side of the battery 18 to the wires 100, 78, and 141, contact 90, armature 70, wire 55, signal lamp 3, and wires 134 and 97 to the negative side of the battery.

After leaving the signal rail 19ᵈ, the shoe 21 will be lowered into contact with the terminals 22 and 23, and the relay 10 will remain energized by means of its holding coil 40, through a circuit from the positive side of the battery 18 to the wire 100, contact 23, shoe 21, contact 22, wires 12 and 25, contact 89, armature 69, wire 144, coil 40, and wires 149, 57 and 97 to the negative side of the battery 18 whereby the signal lamp 3 continues to burn.

Let it be assumed that the train 214 is still standing in the block G and that the train 215 has moved far enough into the block E to contact with the signal rail 19ᵉ. Current will then flow through a circuit from one terminal of the generator 201 to the wires 207 and 126ᵍ, contact 115ᵍ, armature 109ᵍ, wire 129ᶠ, contact 113ᶠ, armature 108ᶠ, wire 107ᵉ, signal rail 19ᵉ, shoe 21, wire 59, coils 27, 28, 29, 30 and 31, and their corresponding condensers, wire 56, axle 16, wheels 15, rails 17, resistance 128ᵉ and wires 127ᵉ and 206 to the other terminal of the generator 201. As only the condenser 51 and the coil 31 are in resonance for current of the frequency produced by generator 201, only the armatures of the relay 11 will be attracted. This will cause the signal lamp 2 to glow through a circuit from the positive side of the battery 18 to the wires 100 and 142, contact 93, armature 73, wire 95, signal lamp 2, and wires 135 and 97 to the negative side of the battery 18.

After leaving the signal rail 19ᵉ, the shoe 21 will be lowered to contact with the terminals 22 and 23, and the relay 11 will remain energized by means of its holding coil 41 through a circuit from the positive side of the battery 18 to the wire 100, contact 23, shoe 21, contact 22, wires 12 and 32, contact 92, armature 72, wire 143, coil 41, and wires 58, 57 and 97 to the negative side of the battery 18 whereby the signal lamp 2 will continue to burn.

Let it now be assumed that the train 214 is still standing in the block G and that the train 215 has moved far enough into the block F to bring its shoe 21 into contact with the signal rail 19ᶠ. None of the relays 7, 8, 9, 10, and 11 can become energized, as the outside circuits for their respective coils 27, 28, 29, 30 and 31 are broken at the armature 108ᵍ and the holding circuits of their coils 37, 38, 39, 40 and 41 are broken due to the raising of the shoe 21 by the signal rail out of contact with the terminals 22 and 23. When the relays 7, 8, 9, 10 and 11 are thus deënergized, the danger signal lamp 1 will glow through a circuit from the positive side of the battery 18 to the wires 100, 78 and 138, contact 82, armature 62, wire 79, armature 65, contact 85, wire 76, contact 88, armature 68, wire 75, armature 71, contact 91, wire 77, contact 94, armature 74, wire 96, signal lamp 1 and wires 136 and 97 to the negative side of the battery 18. Upon leaving the signal rail 19ᶠ, the danger signal 1 will continue to burn and all the relays 7, 8, 9, 10 and 11 will remain deënergized.

I claim:—

In a device of the character described, in combination; a trackway; a vehicle adapted to travel thereon; a plurality of signals carried by the vehicle; signal rails positioned along the trackway; an oscillatable shoe on the vehicle; means for energizing the signal rails with current of different characteristics; a plurality of relays on the vehicle, one for each signal, each relay operable only by current of a particular characteristic; means including the shoe and a signal rail for deënergizing all of the relays and means including the contact shoe for maintaining the energization of a relay which has been energized.

In testimony whereof I affix my signature in presence of two witnesses.

CLARENCE E. CHATFIELD.

Witnesses:
 LUTHER RINGER,
 ANNA C. PERS.